Sept. 6, 1955      A. QUERCETTI      2,716,838
GALLOPING ANIMAL TOY
Filed Oct. 23, 1951
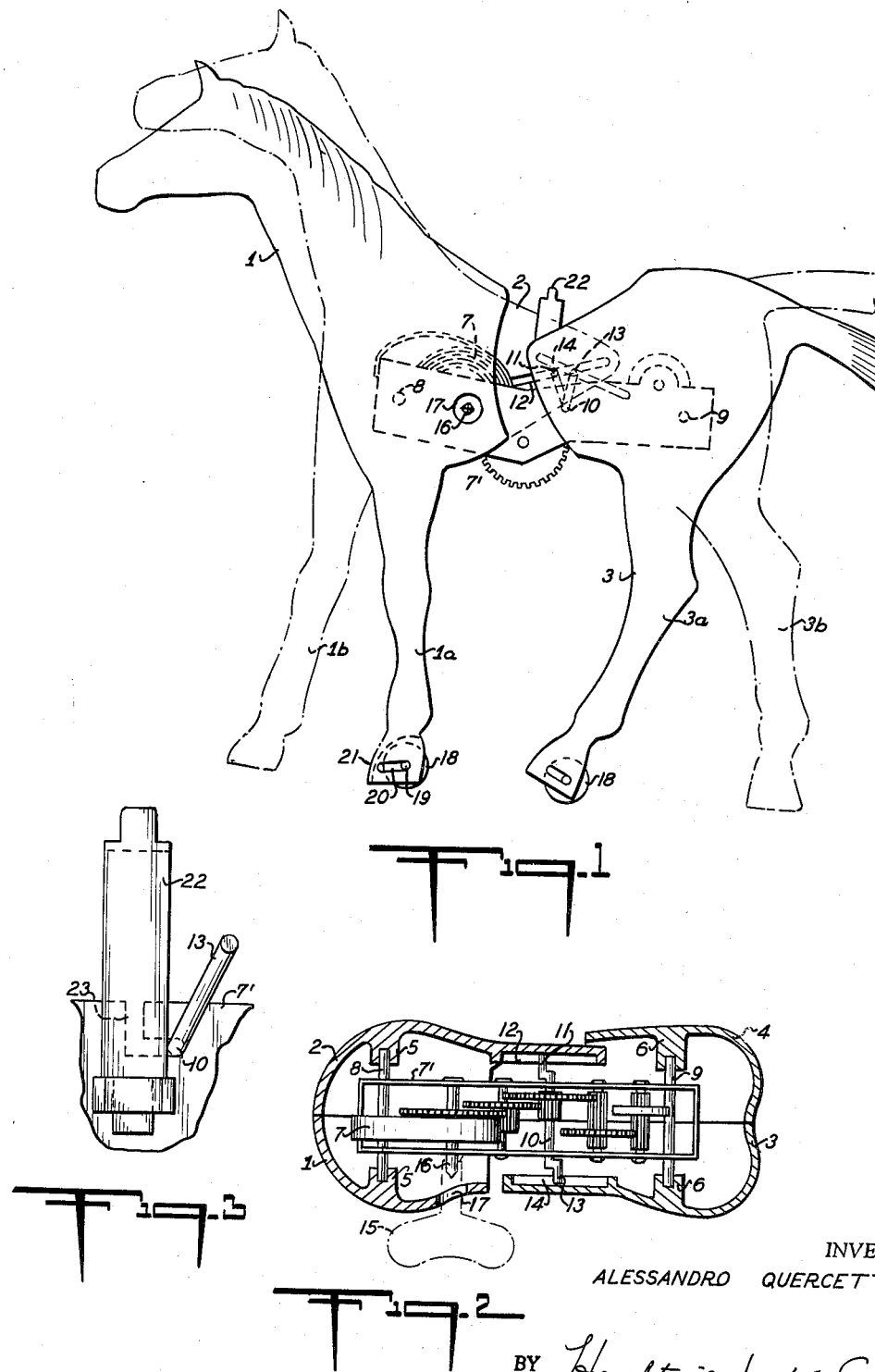
INVENTOR
ALESSANDRO QUERCETTI
BY Haseltine Lake & Co.
AGENTS

United States Patent Office 2,716,838
Patented Sept. 6, 1955

2,716,838
GALLOPING ANIMAL TOY
Alessandro Quercetti, Turin, Italy

Application October 23, 1951, Serial No. 252,592

Claims priority, application Italy October 26, 1950

2 Claims. (Cl. 46—105)

This invention relates to a toy in the form of an animal, such as a horse, which is actuated by a motor to reproduce gallop by gradually drawing together and apart the fore and rear legs, so as to simultaneously perform a forward movement.

Toys of this kind are known which, however, do not faithfully reproduce the animal movements and cannot therefore give a proper illusion of a galloping animal. This is due to the fact that in the latter toys the movable parts were constituted by the hind legs of the animal only while, as I have ascertained, in order faithfully to imitate a gallop, the parts pertaining to the animal body should take part in the movement. Moreover, in prior toys of this kind, the cinematic connections between the motor, generally a spring motor, and the movable animal members were not in a condition to afford a faithful reproduction of the true gallop, but produced non harmonious jumps very far from natural movements. It is the main object of this invention to remove these drawbacks and provide an animal toy, adapted faithfully to imitate a true gallop.

According to this invention, the body of the animal, more particularly a horse, consists of two distinct portions, namely a fore portion comprising the front portion of the body, head and fore legs, and a rear portion comprising the rear body portion and hind legs. As distinct from any prior construction, the connection between these two parts of the body is directly established by the motor frame, which is invisible from the outside, said frame being provided with two longitudinally spaced pivots having articulated thereto said two parts constituting the animal body. Two driving cranks extend from opposite frame sides respectively, and they are engaged by a groove formed in the front body portion and a groove formed in the rear body portion respectively, so that during rotation of the cranks, the said two body portions perform oscillating synchronised movements deprived of any discontinuity. With this arrangement, which will be explained in greater detail hereafter, the observer of the moving animal does not merely see an oscillating movement of the animal legs, but the impression is conveyed to him that the whole animal body is elastic and movable.

Further features of the invention will be understood from the appended specification referring to the accompanying drawings showing a construction according to this invention as applied to horse toy.

Figure 1 is an elevation,
Figure 2 is a horizontal section and
Figure 3 is a detail view of the toy.

The fore and rear portions of the horse are made up of two shells 1, 2 and 3, 4, for instance of thermoplastic material, welded together.

A spring motor 7 having a frame 7' and actuating a crankshaft 10 is arranged within the horse. The frame 7' has the fore portion of the horse hinged thereto about a pivot 8 reaching within bosses 5 formed in the shells 1 and 2, the rear portion being journalled about a pivot 9 reaching within bosses 6 formed in the shells 3 and 4. The pivots 8 and 9 are parallel with the shaft 10.

The shaft 10 is provided at one end with a crank 11 engaged by a groove 12, invisible from the outside, which is formed in the shell 2 of the fore portion. A crank 13 is provided at the other shaft end and is engaged by a groove 14 in the shell 3 of the rear portion.

The spring of the motor 7 is loaded by means of a key 15 engaging a square-section shaft 16 through a hole 17 in the shell 1.

Castor wheels 18 are fitted to the ends of the legs and have their pivots 19 movable within slots 20 formed in the legs. The castor wheels may move within recesses 21 likewise formed in the horse legs. The arrangement of the slots 20 and recesses 21 is such that, when the front and rear legs tend to move forward, the castor wheels 18 are free to rotate and take the position shown in Figure 1, while they are pushed and held against the walls of the recesses 21 as soon as the legs tend to recede.

The frame 7' of the motor 7 is provided with an extension 22 for supporting a rider and closing a slot 23 cut in the frame for easier assembly of the shaft 10.

Operation of the toy will be obvious. Rotation of the shaft 10 causes by means of the cranks 11 and 13 the front and rear horse portions to oscillate in contrary directions, alternately bringing the horse from position 1a, 3a to position 1b, 3b and vice versa, imitating the movement of gallop.

The castor wheels 18 prevent the fore and rear legs from receding, whereby the horse safely advances on the supporting surface.

It is, however, pointed out that, as a matter of fact, the movements of the toy are not the result of mere oscillations of the portions 1 and 3 about the pivots 8, 9 respectively, but are more complex. In fact, when the rear wheels 18 react against the floor, the portion 1 carries out an angular movement about the pivot 8 but at the same time both the portion 1 and motor frame 7' rotate as a whole about the pivots; this results in a composite harmonious movement, which cannot be compared with the movements of previously known toys. Moreover, since the cranks 11 and 13 are angularly displaced to each other, the result is a partial superposition of the movements of the two constituent portions of the animal body, exactly as in a true gallop.

I wish it to be understood that I do not desire to limit myself to a toy in the form of a horse, and that the spring motor may be replaced by another motor, such as an electric motor.

What I claim is:

1. A galloping animal toy comprising a hollow front body portion including a head and a front pair of legs, a hollow rear body portion including a rear pair of legs, a motor having a frame substantially wholly enclosed by said front and rear portions, said two body portions being pivoted to said frame at two longitudinally spaced pivots, a motor shaft intermediate said pivots, said shaft having crank ends extending from said frame, a groove in the front body portion opposite one crank, a groove in the rear body portion opposite the second crank, said cranks engaging the respective grooves, a ground engaging roller at the lower end of each leg, and a one-way detent means on each leg for locking the roller upon a backward swing of the leg.

2. A galloping animal toy comprising a hollow front body portion including a head and a front pair of legs, a hollow rear body portion including a rear pair of legs, a motor having a frame substantially wholly enclosed by said front and rear portions, said two body portions being pivoted to said frame at two longitudinally spaced pivots, a motor shaft intermediate said pivots, said shafts having crank ends extending at opposite sides of said frame, a rearwardly extending flank fast with the front portion at one side of the frame, a forwardly extending flank fast with the rear portion at the opposite side of the frame, grooves in said forwardly and rearwardly extending flanks, said crank ends engaging said grooves, a ground engaging roller at the lower end of each leg, and a one-way detent means on each leg for locking the roller upon a backward swing of the leg.

References Cited in the file of this patent

UNITED STATES PATENTS

| | | |
|---|---|---|
| 1,143,315 | Poland | June 15, 1915 |
| 1,670,060 | Butterfield | May 15, 1928 |

FOREIGN PATENTS

| | | |
|---|---|---|
| 525,758 | France | June 16, 1921 |